United States Patent [19]

Schumacher

[11] Patent Number: 4,485,409
[45] Date of Patent: Nov. 27, 1984

[54] DATA ACQUISITION SYSTEM FOR LARGE FORMAT VIDEO DISPLAY

[75] Inventor: Peter M. Schumacher, Great Falls, Mont.

[73] Assignee: Measuronics Corporation, Great Falls, Mont.

[21] Appl. No.: 363,272

[22] Filed: Mar. 29, 1982

[51] Int. Cl.$^3$ .............................................. H04N 7/18
[52] U.S. Cl. ...................................... 358/294; 358/93; 358/107; 358/903
[58] Field of Search ................. 358/107, 101, 93, 102, 358/294, 903; 364/521

[56] References Cited

U.S. PATENT DOCUMENTS

| | | | |
|---|---|---|---|
| 4,118,730 | 10/1978 | Lemelson | 358/107 |
| 4,295,198 | 10/1981 | Copeland | 358/107 |
| 4,315,282 | 2/1982 | Schumacher | 358/107 |
| 4,360,876 | 11/1982 | Girault | 364/521 |
| 4,389,669 | 6/1983 | Epstein | 358/107 |
| 4,393,410 | 7/1983 | Ridge | 358/294 |
| 4,400,727 | 8/1983 | Aron | 358/102 |

Primary Examiner—Howard W. Britton
Attorney, Agent, or Firm—Dorsey & Whitney

[57] ABSTRACT

A new revolutionary approach to image processing is disclosed. The current limitations of video technology in video image analysis and processing are eliminated. A new "large format" data acquisition system is described which permits a user of the system to process analog data with any required degree of resolution. The degree of resolution obtainable is limited only by the application and source data in connection with which the system is being utilized. The preferred embodiment of the invention permits the analog data source, a map, a photograph, an x-ray, or any other two or three dimensional object or data that can be imaged on a video system, to be segmented into a series of video images which, when sequentially processed, produce an accurate mosaic of the original image. In this manner the size, the shape or image of a rock, a tree or a pond in a photograph of a one acre field can be precisely viewed, measured or outlined for whatever purpose the user of the system desires. The basic components of the system are an X-Y positioning table, a microcomputer, a video camera for acquiring the segmented images, and an ordinary TV set for use in display and analysis of the segmented images that make up the entire analog record of the original image. The possible applications of the system are virtually unlimited in the fields of agriculture, agronomy, animal husbandry, manufacturing, quality control, weather, medicine, and the like, and the possible forms of analysis are similarly unlimited in that the system can be used for analysis of area, distance measurements, density, heat characteristics or any other subject which can be electromagnetically imaged.

38 Claims, 28 Drawing Figures

Microfiche Appendix Included
(1 Microfiche, 16 Pages)

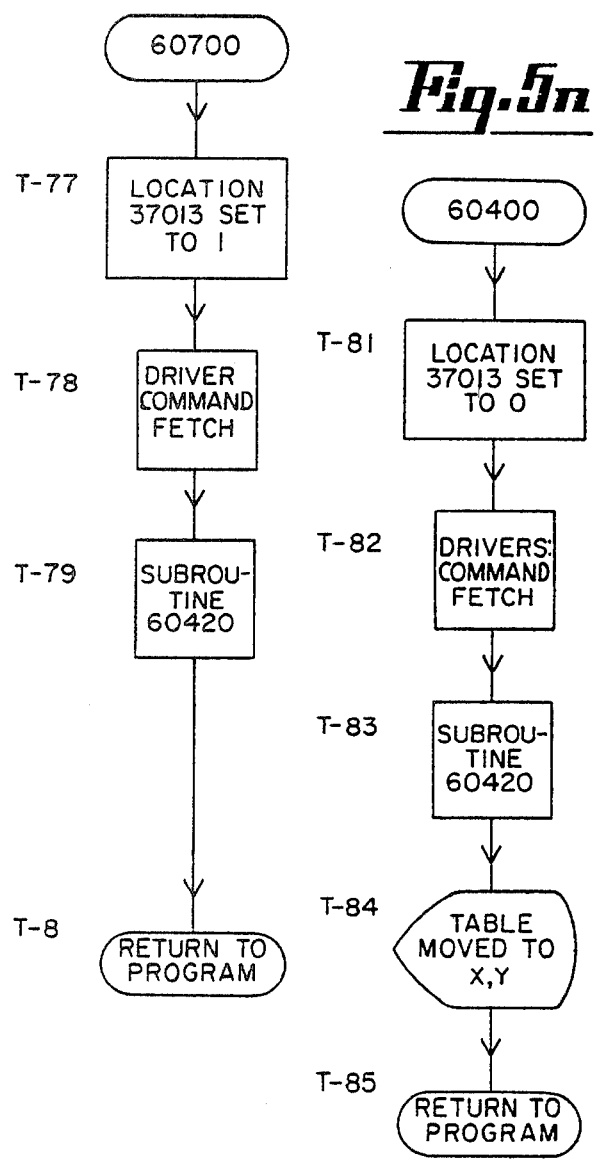
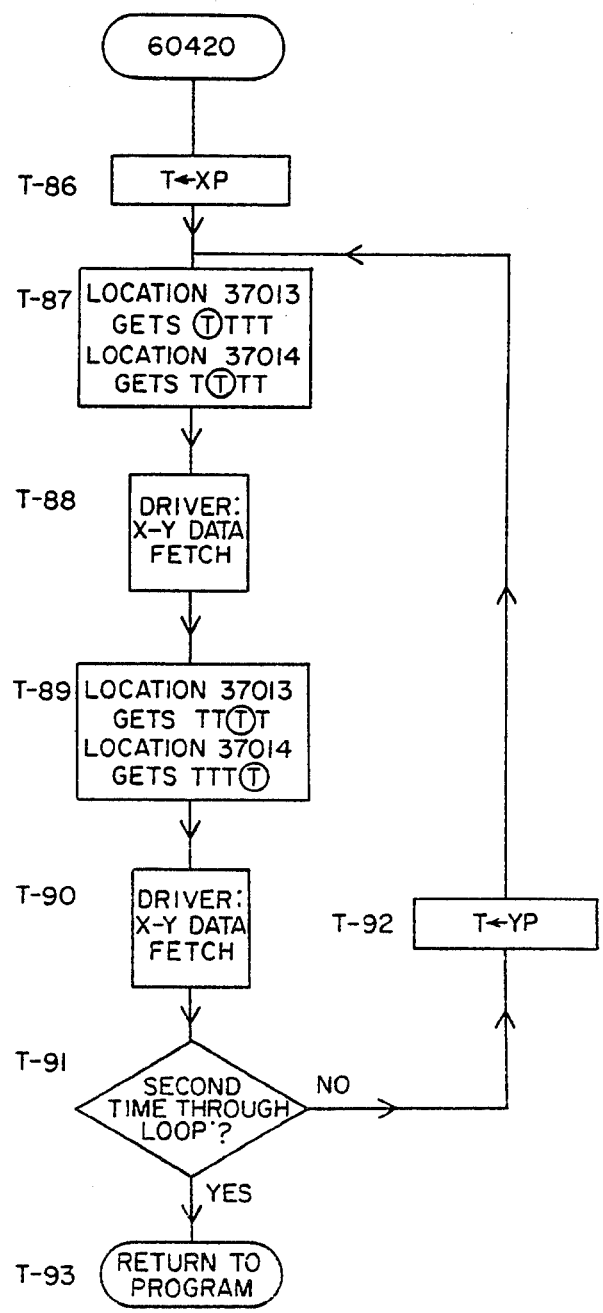
Fig. 5m, Fig. 5n, Fig. 5o

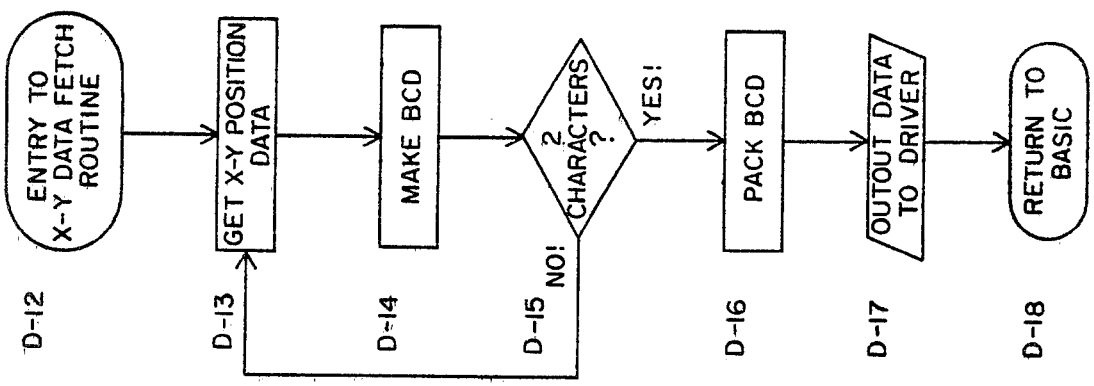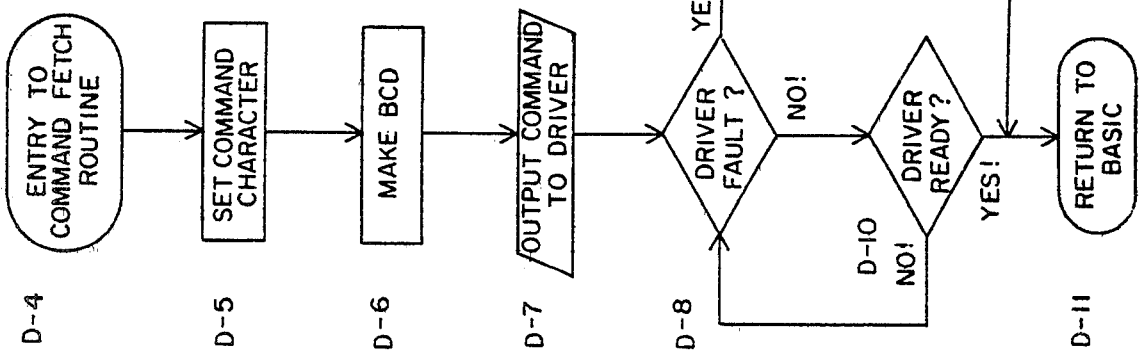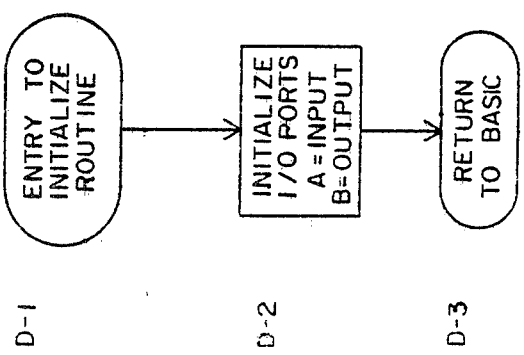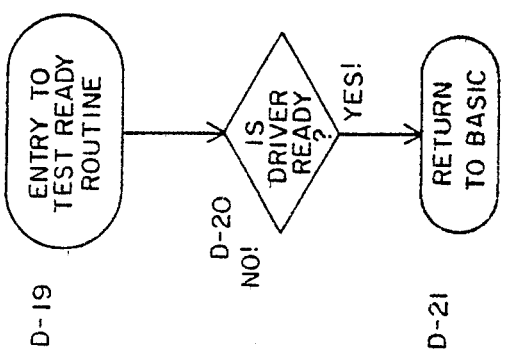

DATA ACQUISITION SYSTEM FOR LARGE FORMAT VIDEO DISPLAY

MICROFICHE APPENDIX

A microfiche appendix comprising one microfiche jacket and having 16 total frames forms a part of this specification by reference hereto.

BACKGROUND OF THE INVENTION

The invention relates to video display systems and particularly to video display systems requiring high resolution of detail in the displayed image.

The invention is directed to the need to extract small features from large surface areas using video technology. The primary problem inherent in the prior art is that analog data sources such as maps, photographs and x-rays present thousands of lines (or points per line) of information per inch of surface over many square inches of surface area. A single frame of common video can resolve fewer than a thousand lines (or points pef line). Typical video resolution is about five hundred lines (or points per line) for common video products on the market today.

The solution to this problem, represented by the present invention, involves understanding "format size" as a function separate from "resolution". "Resolution" describes a specification as to the number of resolvable points of information available per unit of distance or area relative to the material used to produce the image (map, x-ray or the like) or to scan the subject being imaged (film, video camera, and the like). It can be described in familiar terms as the "grain of the film" or the "line resolution quality" based on some standard image pattern exposed through a standard "format size" film or camera sensory plate. "Format size" refers to a unit of distance or area describing the actual physical size of the film plate employed or the camera sensory plate.

For example, if it is necessary to capture one thousand points of information per line, one could use a piece of film which had a one thousand line per inch resolution with a small format size of one inch or one could use a piece of film with a five hundred line per inch resolution and a two inch format size.

Where the problem becomes most evident is in the case of video which exists most commonly in the (approximately) sixteen millimeter format size with a maximum resolution, most commonly, of only about five hundred lines. Video camera format sizes are typically related to the diameter of the target (camera sensory plate) housing. The most common sizes are two-thirds inch and one inch. Either size is used with optics and designs of a mechanical and electronic nature to produce the equivalent performance of approximately sixteen millimeter film format size.

SUMMARY OF THE INVENTION

It is a primary object of the invention to capture an image having a large surface area relative to video format size, such as a thirty inch by forty inch map, with sufficient line detail to attain high resolution. In order to capture the image with line detail of one hundred lines per inch it is necessary to capture the image with thirty times one hundred or a three thousand line resolution. It is an object of the invention to achieve this requirement with current techniques of video imaging.

As indicated above, the format size of video imagery is sixteen millimeters (approximately) with a 3:4 aspect ratio and typical resolution of five hundred lines per sixteen millimeter image. To capture the thirty inch width of the map according to the present invention requires six separate sixteen millimeter format size images, each with five hundred line resolution, to obtain the three thousand lines required.

Only three-fourths of the format size width is available vertically in video. Therefore, three-fourths of approximately sixteen millimeters, or twelve millimeters, is available. This is due to the aspect ratio (3:4) for video format size. In fact, if five hundred lines is representative of five inches of map surface (five inches times one hundred lines per inch) then only three-fourths times five inches (3.75 inches) will be covered vertically. Therefore, the forty inches of map height will need to be divided into 3.75 inch segments, so approximately 10.6 separate images will be required vertically to cover the map adequately and obtain the line resolution required.

In other words, since video technology is confined to sixteen millimeter format size and approximately five hundred lines per sixteen millimeter image, then the entire thirty by forty inch map can be imaged in sixty-six separate images or six images per row in eleven columns, to obtain the desired resolution and clarity.

By a similar analysis, if the required resolution is only fifty lines or points of information per inch, due to the scale of the map or photograph, or accuracy requirements or the like, then the entire surface can be captured in eighteen video scans, three images per row in six columns.

When the map is imaged using small format size processing equipment, with multiple exposures or image segments, the resulting images represent only one segment each of the original objective (map, photograph, x-ray, or the like) and can only be made to represent the total original objective or piece of work if they are assembled as a mosaic with each image being a mosaic piece of the total mosaic image of the objective. The mosaic reassembly can only be accomplished if each piece (image segment) is geometrically correct and each edge is precisely coincident with the edge of the adjacent image segment. The only time at which this can be controlled is during image acquisition.

By precisely selecting the position of the camera performing the image acquisition, it is possible to create the mosaic format in such a way that the resultant image segments can be reassembled more easily and thus achieve the greatest efficiency of image capture onto small format imaging surfaces.

This purpose is accomplished in the preferred embodiment of the invention by using a computer controlled X-Y positioning table and a video camera to create precise relative positioning between the camera and the surface area or object being imaged. The system is used to produce a properly formatted series of video images consisting of an orderly scan of the objective with sufficient detail for high resolution analysis. The result is a series of small format size images which can be reassembled (mosaic processed) into a "large format" image equivalent.

DESCRIPTION OF THE DRAWINGS

FIG. 3, consisting of FIGS. 3a through 3d, shows how the system is calibrated prior to obtaining the segmented video scans to assure accurate mosaic processing of the data obtained.

FIG. 4, consisting of FIGS. 4a through 4c, shows how the individual video segments are obtained when practicing the invention.

FIG. 5 is a functional flow chart of the software used in the microcomputer to provide the control signals necessary to automatically and sequentially obtain the image segments for subsequent mosaic processing.

FIG. 5b is a continuation of the flow chart of FIG. 5a.

FIG. 5l is a subroutine referred to as "60200".

FIG. 5m is a subroutine referred to as "60700".

FIG. 5n is a subroutine referred to as "60400".

And FIG. 5o is a subroutine referred to as "60420".

FIG. 6 is a functional flow chart of the microprocessor software used with the X-Y drivers to assure precise positioning of the table to acquire each image segment precisely aligned relative to each other and to the overall image being processed.

FIG. 6a is an initialization routine.

FIG. 6b is a test routine to determine if a driver is ready.

FIG. 6c is a routine to obtain a command.

FIG. 6d is a routine to obtain data.

DESCRIPTION OF THE PREFERRED EMBODIMENT

Figure 1:
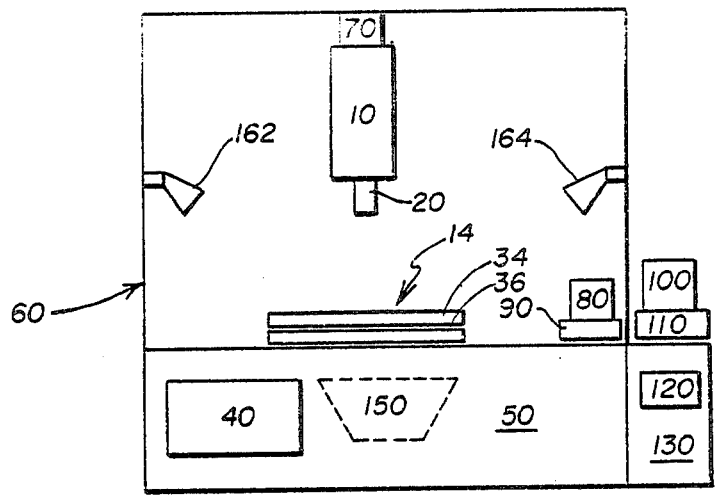
FIG. 1 shows in simplified block diagram form a front elevational view of the major operational components of the system and how they can be physically positioned relative to each other.
Figure 2:
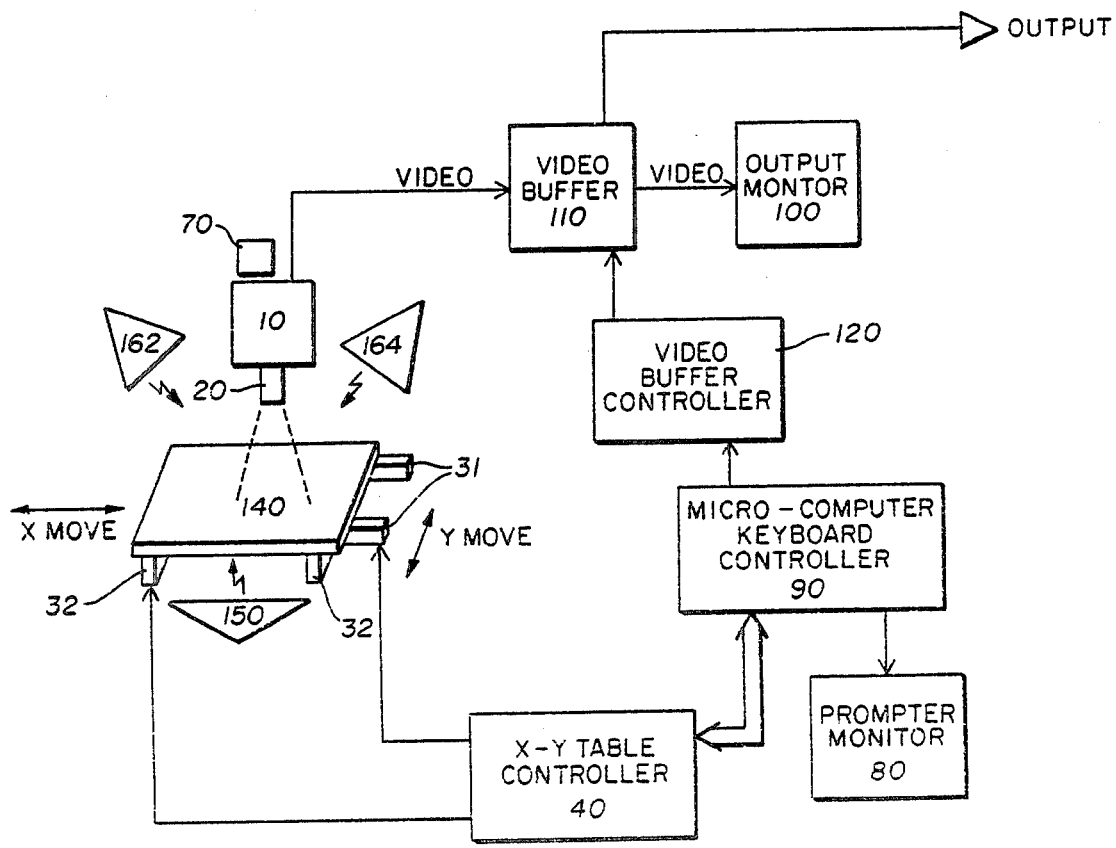
FIG. 2 is a simplified schematic block diagram showing how the components of the automated data acquisition system are electronically interconnected.

The electromechanical components which make up the large format video data acquisition system as they appear to the operator are shown in block diagram form in FIG. 1 and are shown in schematic block diagram form in FIG. 2.

As shown in FIG. 1, a video camera 10 is used to acquire analog video data in selected segments which is later mosaic processed to achieve the purposes of the invention. Mounted on the camera 10 should be lens 20 suitable for the application to which the system is being put. Below the camera 10 is preferably provided an X-Y positioning table 30 moveable in both the X and Y directions. The table 30 consists of two sets of motor driven rails 31, 32, each of which bears "milk" plexiglass light diffusion plates 34, 36 or equivalent. Movement of the motor driven table 30 is accomplished with the use of a table controller 40 which is mounted in the support base structure 50 for the system.

A vertical camera support structure 60 is provided which can be constructed of any suitable material and should be reinforced sufficiently to eliminate any vibration or relative movement between the camera 10 and the X-Y positioning table 30. Attached to the vertical camera support structure 60 is preferably a tip, tilt and rotate correction camera mount structure 70 with vertical height adjustment means. This is used for alignment of the camera 10 sensory plate with the objective surface 140 during calibration.

Instructions from the system to the user-operator are preferably provided on a prompter monitor 80 and instructions to the system by the user-operator are preferably entered on a keyboard controlled microcomputer 90. System output is monitored on a video output monitor 100 the input to which from the camera 10 is stored in a video buffer device 110 which can be a video cassette, a video disc, a video tape or digital translating and recording device. A video buffer controller 120 is also preferably provided to control the storage and retreival processes of the video buffer device 110. Each of the foregoing output devices is preferably mounted on or in a component support structure 130 located immediately adjacent the support base structure 50.

The visual medium to be analyzed is preferably located on the objective surface plate 140 of the X-Y positioning table 30. The objective can be back lighted with a back lighting source 150 located under the X-Y positioning table 30 which lights the objective surface 140 with diffused back lighting through the plexiglass light diffusion plates 34, 36. Alternatively, top lighting sources 162, 164, can be attached to the vertical camera support structure 60 and directed onto the objective surface 140. It should be obvious that high intensity ambient lighting (not shown) can also be used if sufficient for video acquisition of data.

It should be obvious to those skilled in the art that the basic components of the system as shown and described are commercially available, can be replaced by equivalent means, and that the description of a preferred embodiment is not meant to limit the invention as claimed.

In the preferred embodiment the image to be processed, a map, a photograph, an x-ray or other visual medium, is placed on the moveable X-Y positioning table 30 and positioned sequentially under the stationary camera 10. A twenty-four inch X-Y Open Frame Positioning Table manufactured by Design Components, Model No. HM 2424, has been found satisfactory for the application described in connection with the preferred embodiment. Two pieces of plexiglass 34, 36 with even light diffusion characteristics are preferably used on each level of the table (X plane and Y plane) to create even distribution of back lighting. Movement of the table 30 can be achieved with an X-Y table controller 40 receiving move instructions from the microcomputer 90. Satisfactory performance has been achieved using a parallel interface card manufactured by California Computer, Model 7720B, interfacing the computer with two drivers manufactured by Summit Dana, Model Numbers 218-090-02 and 213-092-12. One of these drivers is preferably an intelligent driver with microprocessor control which processes the computer 90 commands for movement for both drivers. Motor control for X and Y movement of the table, rails 31, 32, can be accomplished with two Slo-syn Stepper Motors (M Series) manufactured by Superior Electric, Model No. MO63-FD09, one connected to each driver.

As will be described below, it is also possible, to conserve operating space, to have the image surface plate 140 stationary and have the camera 10, and preferably the light source, 150 or 162 and 164, as well, cycle through sufficient steps to obtain a mosaic of the image.

For the application described in connection with the preferred embodiment, large format video analysis of a map or photographic surfaces, an RCA Video Camera, Model No. TC-1005/01C has been found satisfactory using a Canon zoom lens (V6×18 18×108 mm f1:2.5) and a close-up Diopter Lens set manufactured by Vivitar, Model No. 0550620.

Installation of the equipment requires calibration which makes certain that the camera sensory plane is absolutely parallel to the object surface plane. The adjustments are made with the tip, tilt and rotate and height adjustment controls of the camera mount structure 60.

The weight of the camera 10 is preferably supported by the support structure 60 and interposed between the camera 10 and the support structure 60 is the tip, tilt and rotate correction camera mount structure with vertical height adjustment means 70. Depending on the application, and in view of the accuracy of video technology, the tip, tilt and rotate correction can be simply constructed or capable of extremely fine adjustment or both. Since the vidicon tube in a video camera is usually parallel to the housing, the camera 10 can be rotatably suspended from the support structure 60, spaced therefrom with spacers and shimmed using a bubble level to achieve sufficient leveling for most macro projects. For more precise applications a pair of collars may be used, rotatable relative to each other, one fixed to the support structure 60, the other fixed to the camera 10 housing, with either provided with a series of set screws through one collar and abutting the other collar for precise leveling and alignment. A precision grid drawing (not shown) can be introduced for checking the alignment with an electronically generated grid, with both grids viewed as an overlay on the TV monitor 100.

The camera 10 is also preferably mounted on the support structure 60, with vertical height adjustment means 70. The height adjustment means 70 can also be provided for the application intended for the system. For macro adjustments a sliding tube with lock nut can be provided such as an inverted tripod. For micro adjustments a pair of collars threadedly engaged one with the other can be provided with the camera 10 housing or the camera lens 20, freely rotatable therein. As should be obvious it also is possible to provide both degrees of adjustment in a system, one for rough adjustment and the other for fine calibration if desired.

Operating commands to the data acquisition system and communications from the system can be made through the keyboard controlled micro computer 90 using associated prompter monitor 80. An Apple II Plus system using basic, Apple Assembler and Applesoft Basic programming languages has been found suitable for this application. (Apple, Apple II Plus, and Applesoft are believed to be trademarks of Apple Computer Inc.) In addition, a video buffer device 110 and a video output monitor 100 are also advantageously employed, the video buffer device 110 being any storage medium sufficient to store video analog data such as a video cassette recorder, video disc, video tape recorder, or digital recording and translating device. It is in the video buffer device 110 that the various segments are stored prior to processing. A video buffer controller 120 is preferably provided to control when the video buffer device 110 stores information, although the video buffer device 110 can be controlled manually using the conventionally provided "record", "pause" or "stop" switches associated with such a device.

A video output monitor 100, which can be any standard TV display monitor of conventional design, is also preferably provided for purposes which will be discussed below.

To utilize the system an object to be analyzed, such as a large map, is placed on the object surface 140 of the X-Y positioning table 30 and prepositioned by the operator in accordance with operating instructions to be discussed below. The object surface 140 is selectively illuminated by the back illumination radiant source 150, or the top illumination radiant sources 162, 164, or with any other radiant sources (not shown) such as high intensity ambient lighting.

The operator then selects the appropriate lens 20 setting (either directly or by remote control depending on the lens type and subject matter being analyzed) for iris opening, focal length (zoom) and focus to produce the desired image on the output video monitor 100.

The operator then initiates image subdivision (segmenting) operations for the system. The operator issues commands through the keyboard associated with the microcomputer keyboard controller 90 which appears in text form along with feedback prompts on the prompter monitor 80. The operator's commands and responses are translated in machine coded signals which in turn command the X-Y table controller 40 and the X move and Y move servos.

Software for the system is written so that the operator can easily copy the image being processed into the video buffer 110 for subsequent readout and analysis. The table 30 is initially centered and a chosen increment step is entered into the microcomputer keyboard controller 90 to move the table 30. This may be accomplished through the keyboard or with a thumb wheel switch (not shown) calibrated in thousandths of an inch.

With computer control 40 the table 30 must first be moved so that the upper left corner of the map is aligned with and shown (displayed) in the upper left corner of the video screen. FIG. 3 shows how alignment positions are achieved. For purposes of illustration, the mosaic scanning of a map 180 will be described. It is preferred that four positions be used for system set up. The coordinates of the center of each video scan alignment position are retained and used by the computer for subsequent segmented mosaic processing and for recalculating scanning parameters if, for example, the camera height or lens (zoom) are changed.

However, it should be obvious that alternative means and methods are possible. For example, the objective surface 140 may be scribed for alignment purposes and the aspect ratio for the equipment calibrated by software. Thereafter, the corner positions designated position one and position three could be used to obtain all parameters shown in FIG. 3 and described in connection with the software for the system.

Figure 3A:
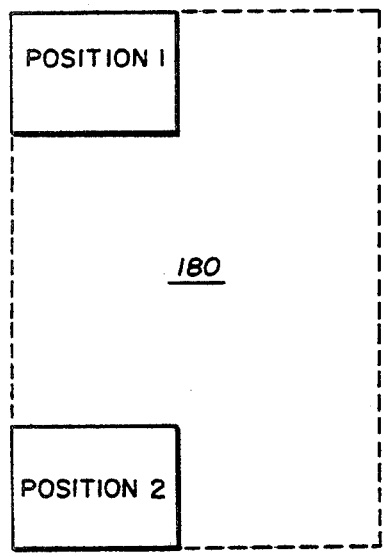
FIG. 3a shows the first two calibration positions.

In FIG. 3a, the area of the map 180 seen by camera 10 is shown in solid lines with the whole map shown as a dash line. The X-Y coordinates, identifying position one, are stored by the computer 40. The operator, using the computer keyboard 90, then moves the table 30 in only the Y direction so that the lower left edge of the map 180 or other image remains aligned or can be adjusted to be aligned with the left edge of the video screen 100. This is designated position two in FIG. 3a.

Figure 3B:
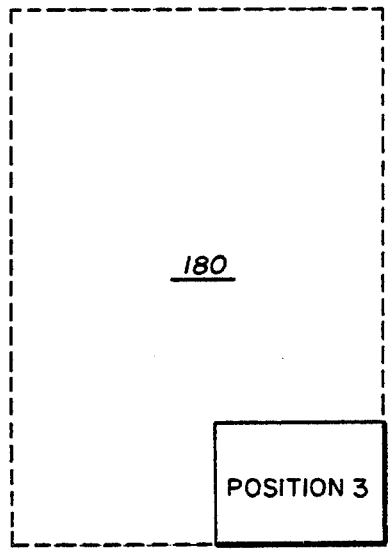
FIG. 3b shows the third preferred calibration position.

The operator then with incremental steps moves the table 30 so that the lower right hand corner of the map 180 is at the lower right hand corner of the video screen 100. This is shown in FIG. 3b indicated to be position three. The program then stores these coordinate positions and returns the table 30 to position one.

Figure 3C:
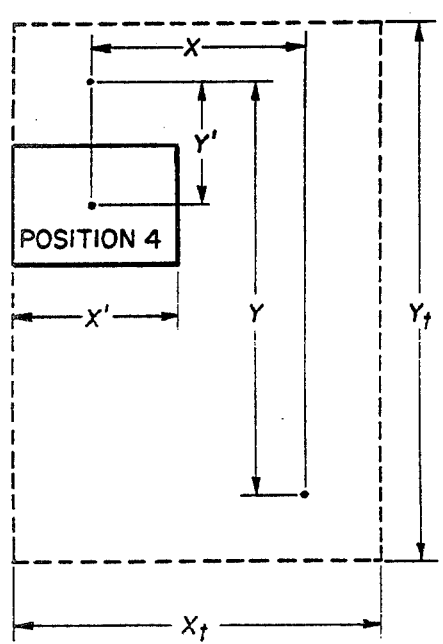
FIG. 3c shows a fourth calibration position and certain calibration parameters.

Although it is also possible for calculations to be made by the computer 90 to compute all further movements based on these three positions, a fourth position shown in FIG. 3c is preferably used to verify the aspect ratio of the system being used, the precise field of view selected for each mosaic segment, and to assure proper operation of the system. With the scene on the video screen 100 showing position one, the bottom edge of the scene is marked so it can become the upper edge for the scene when the table 30 is in position four. The operator is then requested by the prompter monitor 80 to move the table 30, in the Y direction only, to position four. The operator does so by entering the appropriate commands into the keyboard 90. The coordinate locations of these four positions are then used to calculate movement of the X-Y positioning table 30 for proper segmentation of the objective surface 140, map 180, and to provide a number of options to the operator as to how the data will be accumulated.

Using the parameters shown in FIG. 3c the total distance $Y_t$ of the map 180 is calculated from:

$$Y_t = Y + Y'$$

The value for X' is calculated from Y' using the necessary ratio (input by the programmer) for the video screen 100. (It is usually close to: $3Y' = 4X'$.)

The number of rows (r) is calculated by:

$$r = \text{integer}(Y_t \div Y') + 1$$

While the number of columns (c) would be:

$$c = \text{integer}(X_t \div X') + 1$$

Usually the result of the division will not be a perfect integer, but if it is, then a new r' or c' is calculated for processing where $r' = r - 1$, or $c' = c - 1$ as the case may be.

Figure 3D:
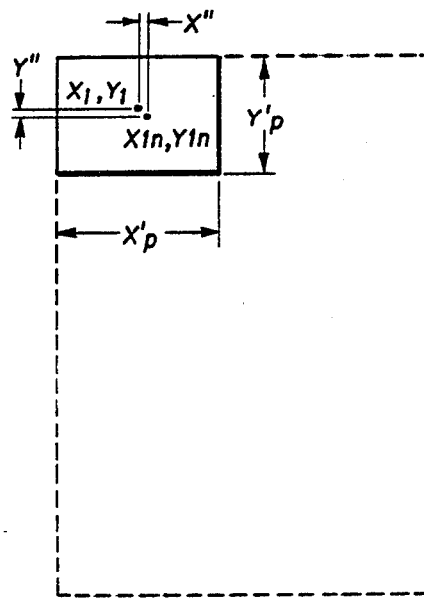
FIG. 3d shows other parameters for recalibration.

At this point the operator can choose to change the camera 10 height. If the operator chooses that option, then, after changing the camera 10 height, the table 30 must be repositioned by operator input to a new position number one with new center coordinates ($X_{1n}$, $Y_{1n}$) as shown in FIG. 3d. That new position is checked to see if the X and Y coordinate changes were in the correct ratio. The X change is ratioed with Y change and the ratio is also used to determine X'' later in this process. If not, the operator is so informed but may use the new values anyway. The new position ($X_{1n}$, $Y_{1n}$) is calculated so the new $Y_1$, $Y_{1n}$, is $Y_{1n} = Y_1 + Y''$. Y'' is the distance in the Y direction that the table was moved in the above repositioning process while locating $Y_{1n}$.

X'' is calculated from Y'' and the ratio so $X_{1n} = X_1 + X''$. The new $Y'_p$ is $Y' + 2Y''$ and the new $X'_p$ is $X' + 2X''$.

It is possible for the camera 10 to be moved so low that the lower right corner could not be seen on the screen 100 with the table 30 movement available. When that happens the operator is told to pick a new height and scene area.

Another operator option is to choose to have an even integer number of rows or columns. A further choice allows a scene area larger or smaller than the present one. For even rows a program calculated $Y'_p$ is found; for columns a new $X'_p$. The other parameter is calculated using the ratio. A new position one is found by $$X_{1n} = X_1 + 0.5(X'_p - X')$$

and $$Y_{1n} = Y_1 + 0.5(Y'_p - Y')$$

The table 30 is moved to the new position one and the operator must adjust the camera 10 to fit the upper left corner of the map 180 to the upper left corner of the video screen 100.

Figure 4A:
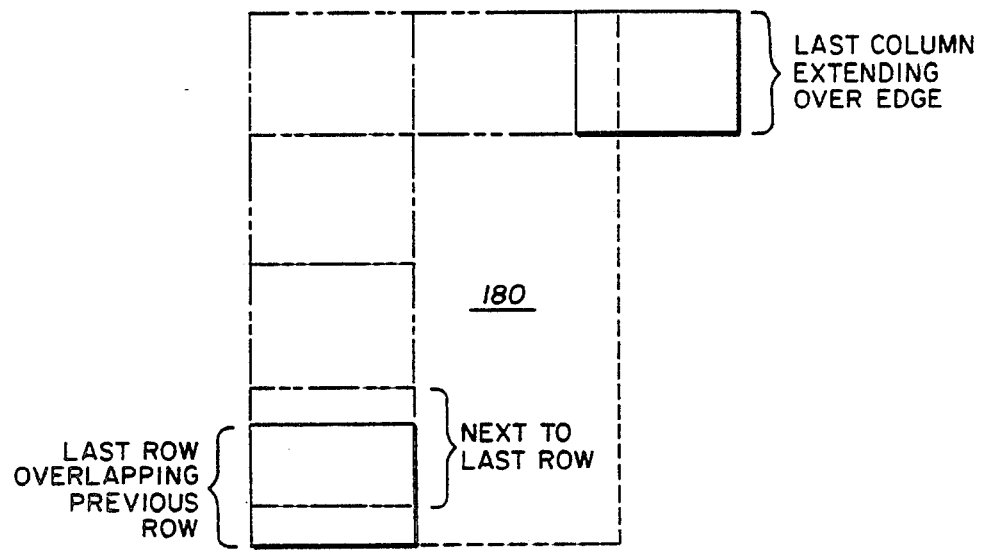
FIG. 4a demonstrates how partial video segments are handled.

In order to cover the whole map 180 an overlap for the last row and column may be necessary. FIG. 4a shows how that may be done by extending the scene over the edge of the map 180 (as shown in the column scans) or by overlapping the previous scene (as shown in connection with the row scans). The operator may choose which is preferred separately for rows and columns. If the table 30 movement available would not allow extension over the edge of the map 180 then the user is automatically limited to overlapping a previous row or column by program control.

Once the set-up for segmenting has been accomplished the operator of the system issues commands through the microcomputer keyboard controller 90 which causes the X-Y movement of the object's surface 140 to be semiautomatically or fully automatically controlled by the system. As data acquisition is being accomplished the microcomputer keyboard controller 90 issues commands to the video buffer 120 instructing the buffer 120 to record, pause, or cease recording (stop) thus keeping the recorded image segments to a minimum since the "record" instruction occurs only when the object's surface 140 for the "next segment" has reached the proper position relative to the camera 10 to be presented through the lens 20 and camera 10 to the video buffer 110. When the object surface/camera relative position is between proper segments the computer 90 may issue a stand-by "pause" command which is refined and issued by the buffer controller 120 to the video buffer 110 thus inhibiting recording when anything other than a valid video image segment is being presented to the video buffer 110.

Figure 4B:
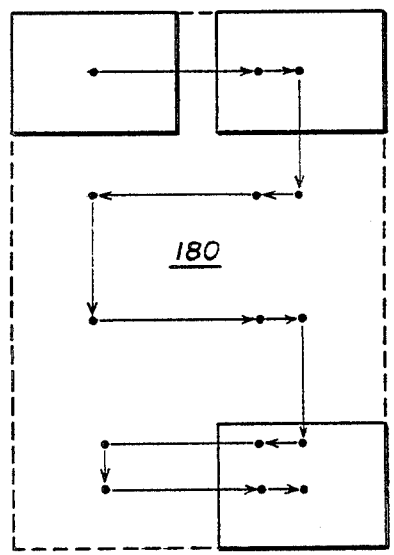
FIG. 4b shows a first scan pattern which may be utilized with the invention.

The program then controls the movement of the table 30 so the entire map 180 is seen in individual segmented scenes in the manner shown FIG. 4b. The operator may control the sequential acquisition of scenes by entering a "C" ("C"ontinue) to move the table 30 from one scene to the next. The operator may alternatively choose to have the computer 90 automatically move through the whole map 180, stopping at each scene for any one of three preselected time periods.

Figure 4C:
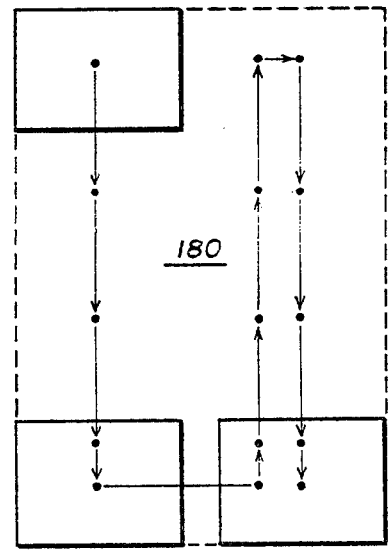
FIG. 4c shows an alternative or second scan pattern that may be utilized with the invention.
Figure 5A:
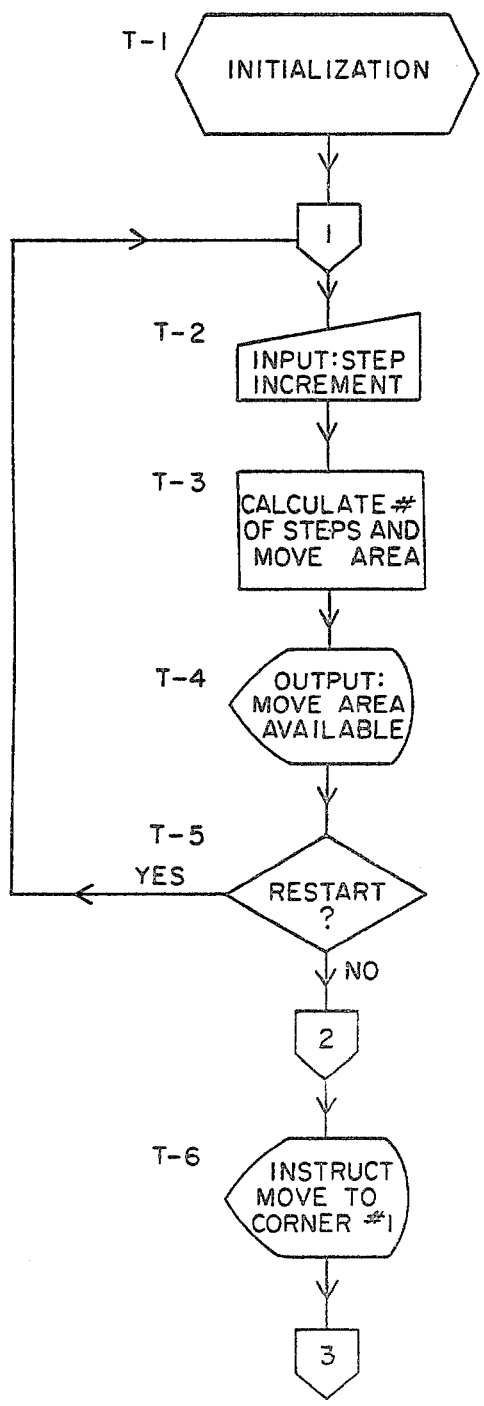
FIG. 5a represents the initial steps of the flow chart.
Figure 5B:
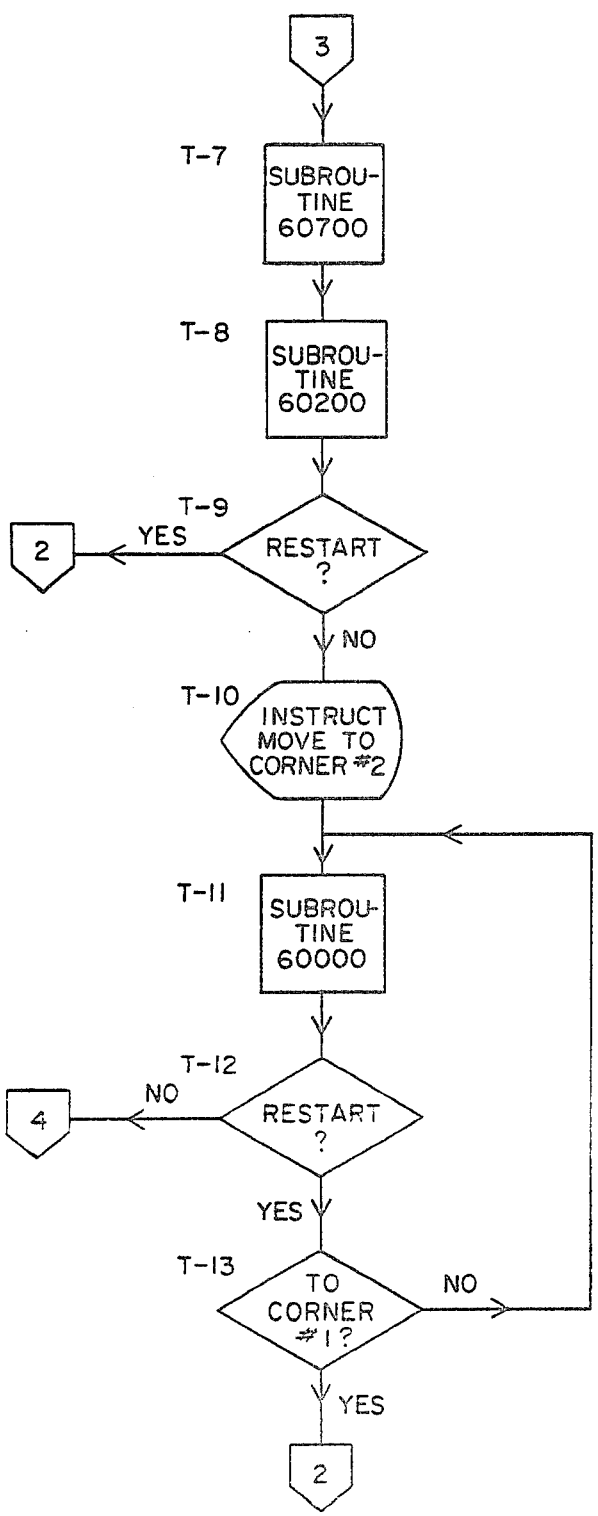
Figure 5C:
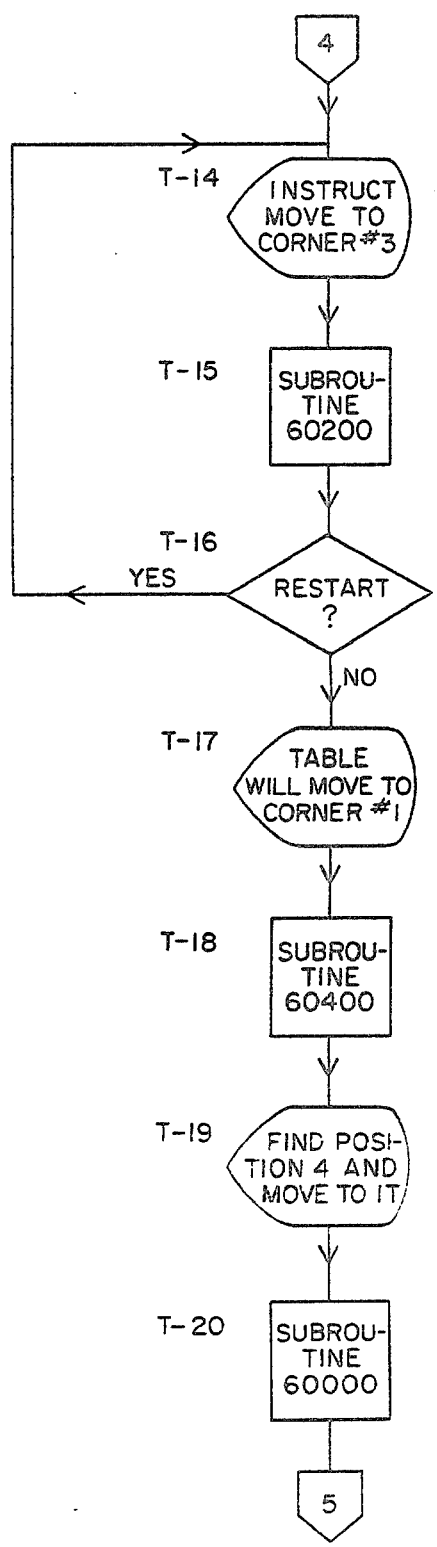
FIG. 5c is a continuation of the flow chart of FIG. 5b from branch point 4.
Figure 5D:
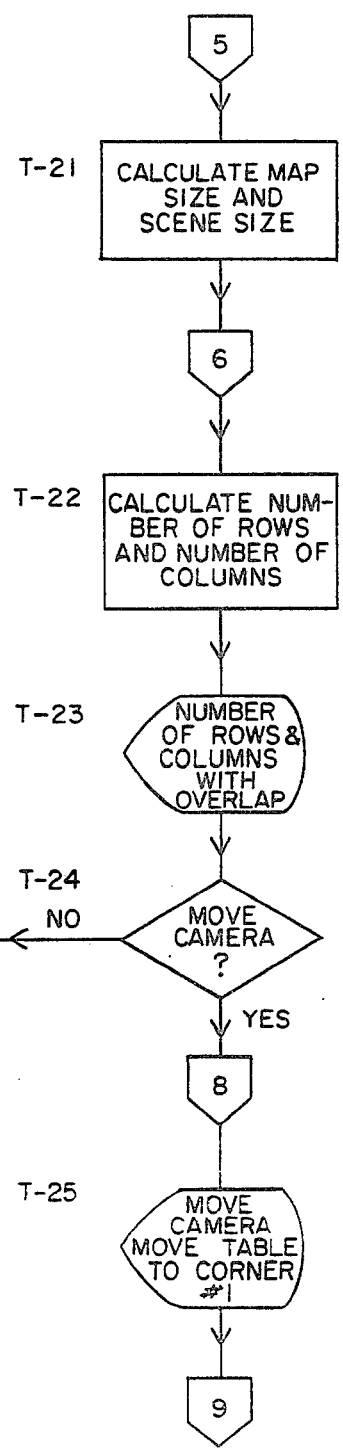
FIG. 5d is a continuation of the flow chart of FIG. 5c.
Figure 5E:
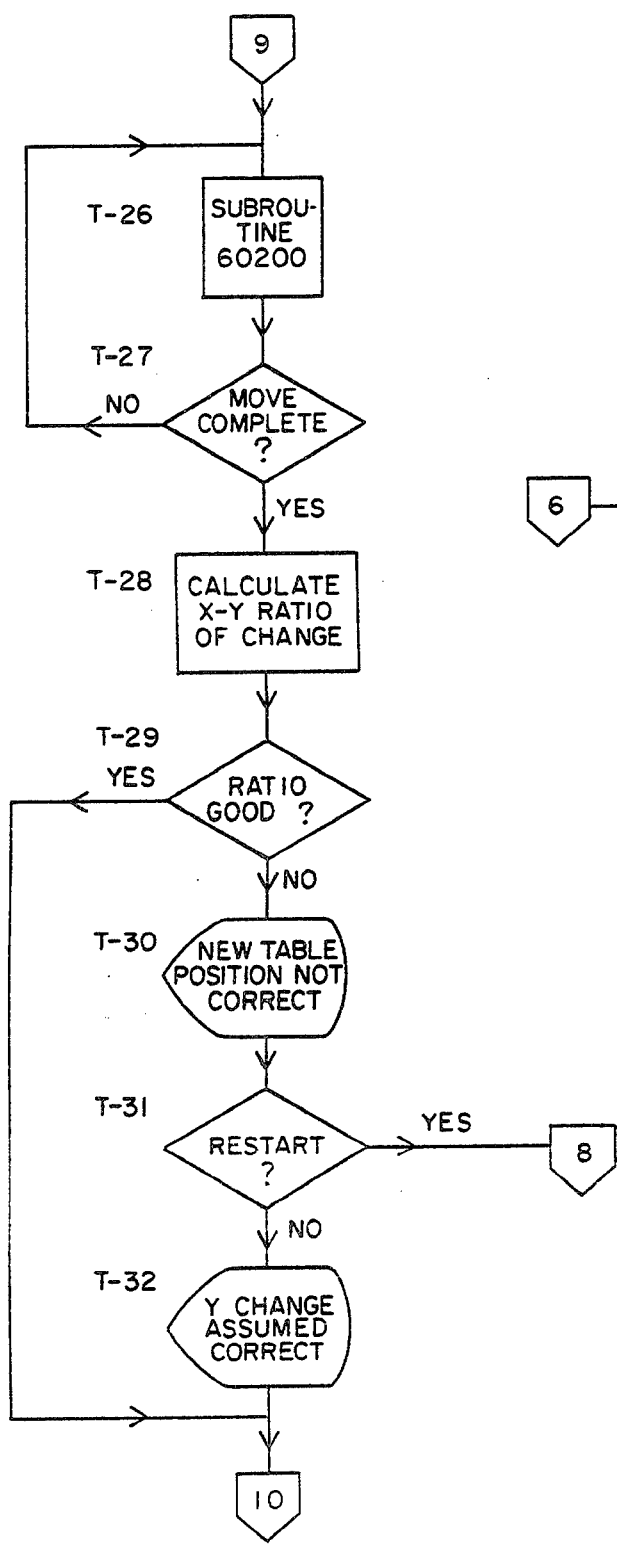
FIG. 5e is a continuation of the flow chart of FIG. 5d.
Figure 5F:
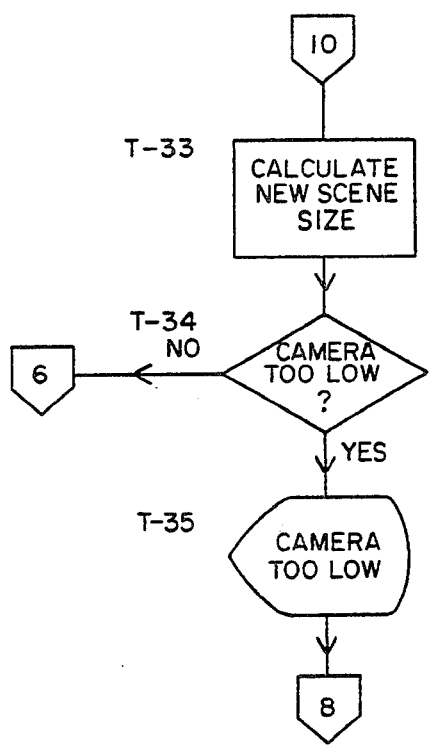
FIG. 5f is a continuation of the flow chart of FIG. 5e.
Figure 5G:
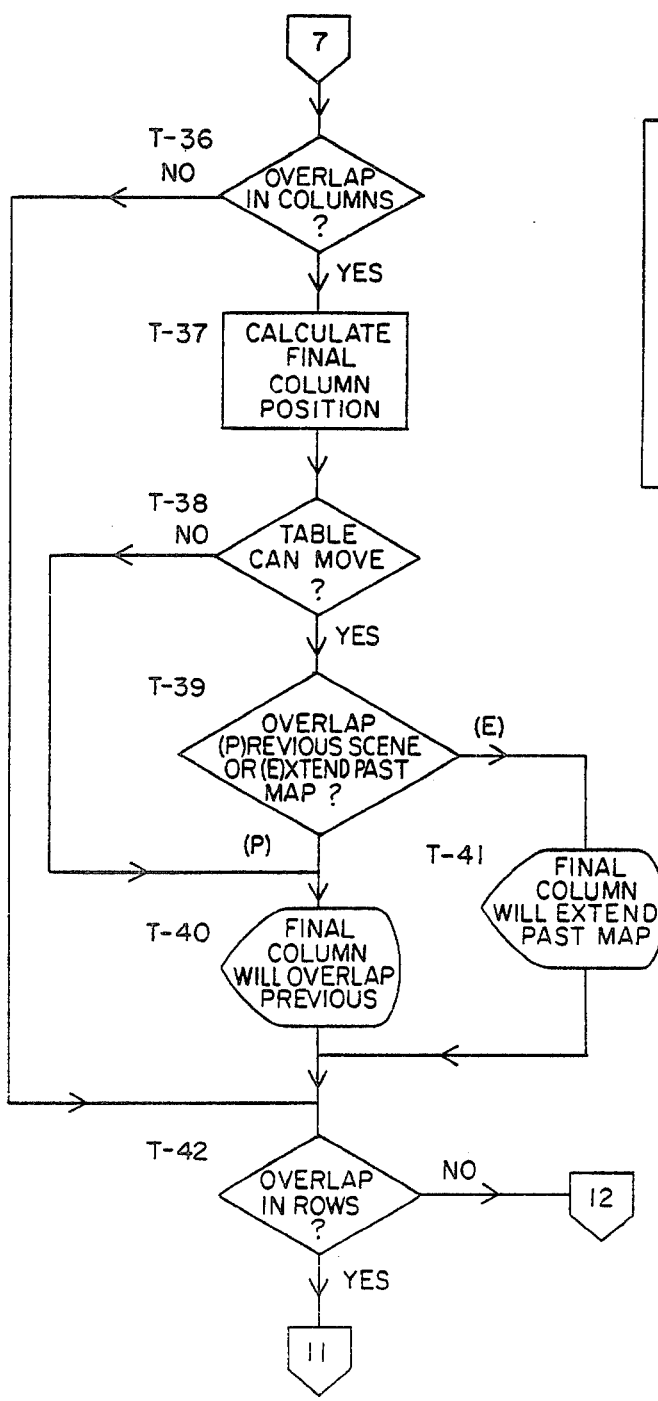
FIG. 5g is a continuation of the flow chart of FIG. 5d from branch point 7.
Figure 5H:
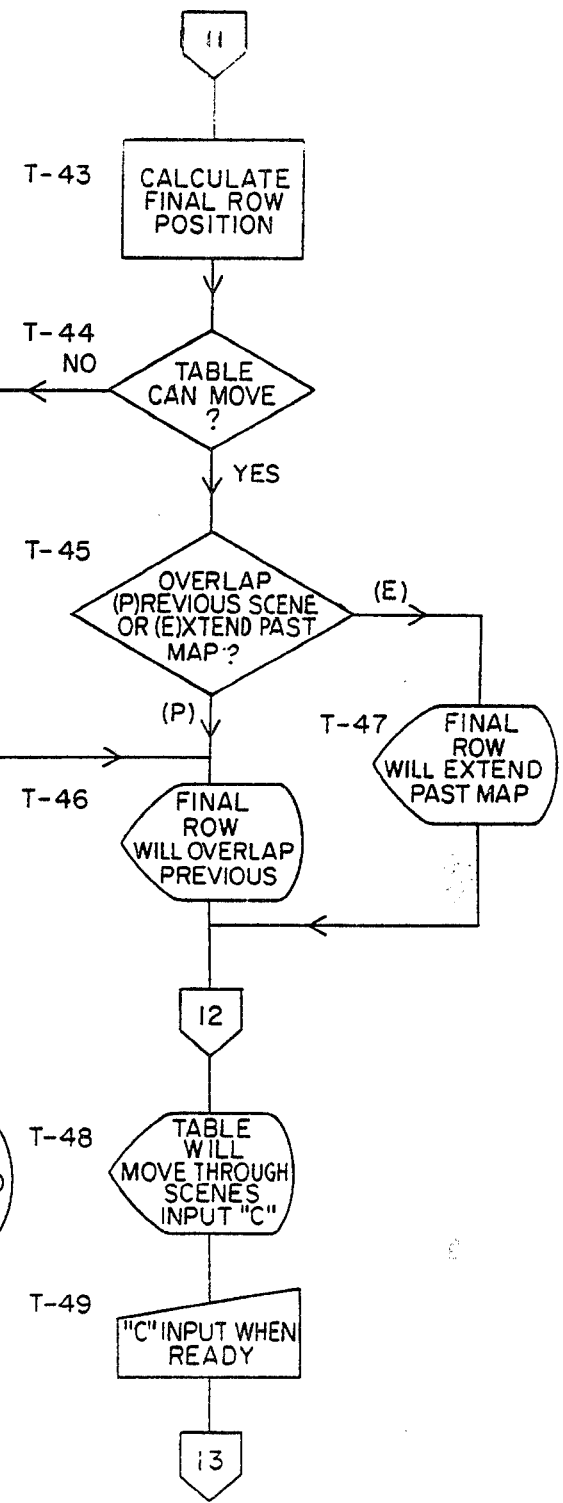
FIG. 5h is a continuation of the flow chart of FIG. 5g.
Figure 5I:
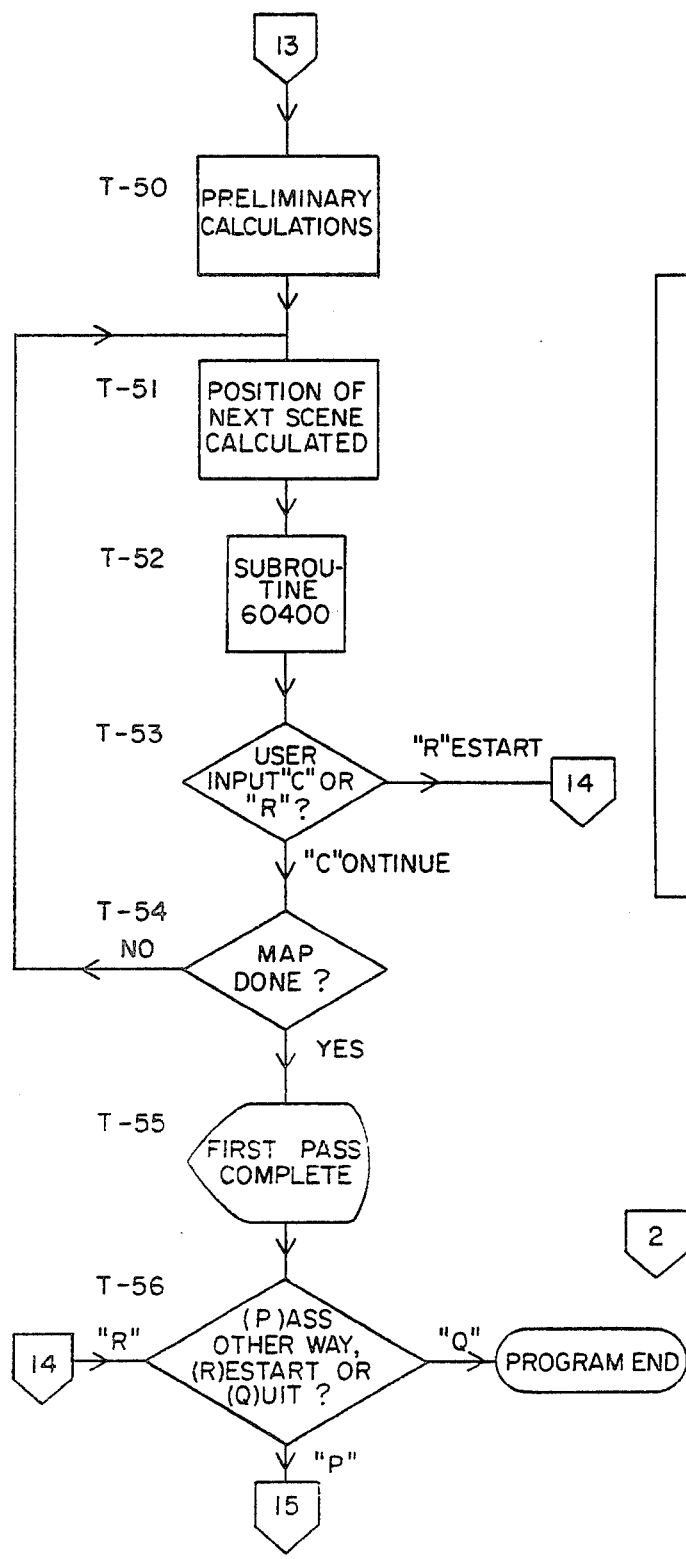
FIG. 5i is a continuation of the flow chart of FIG. 5h.
Figure 5J:
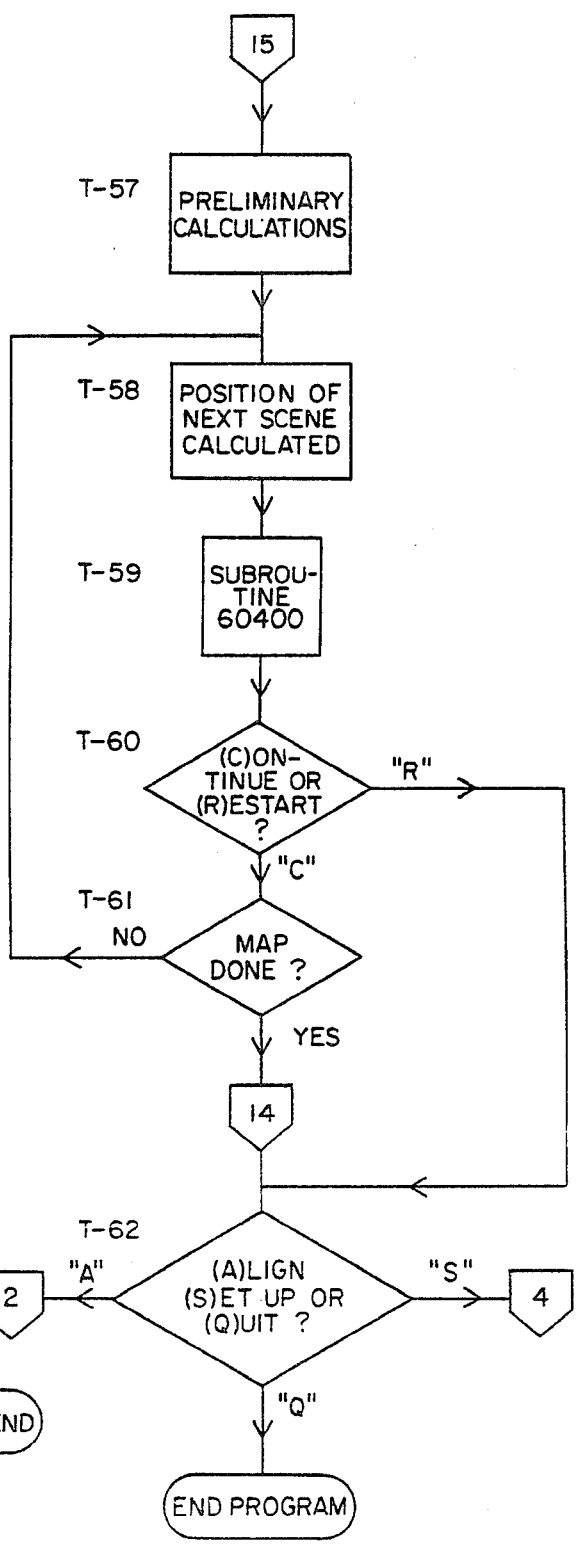
FIG. 5j is a continuation of the flow chart of FIG. 5i.
Figure 5K:
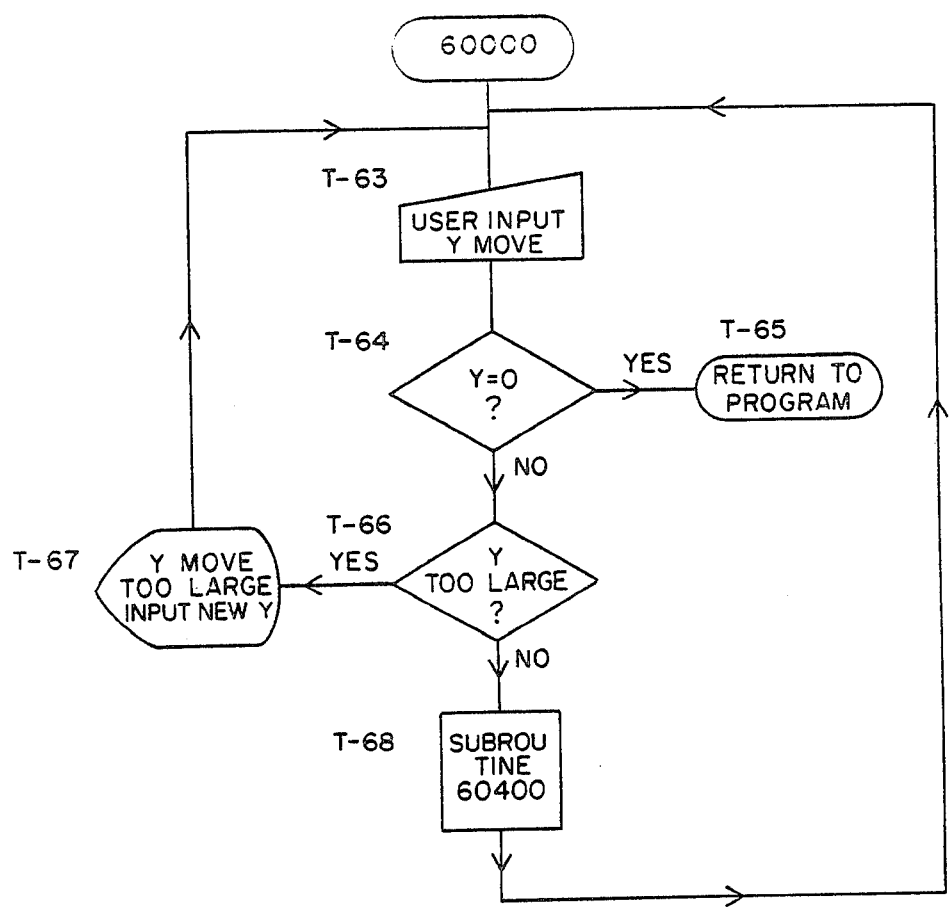
FIG. 5k is a subroutine referred to as "60000".
Figure 51:
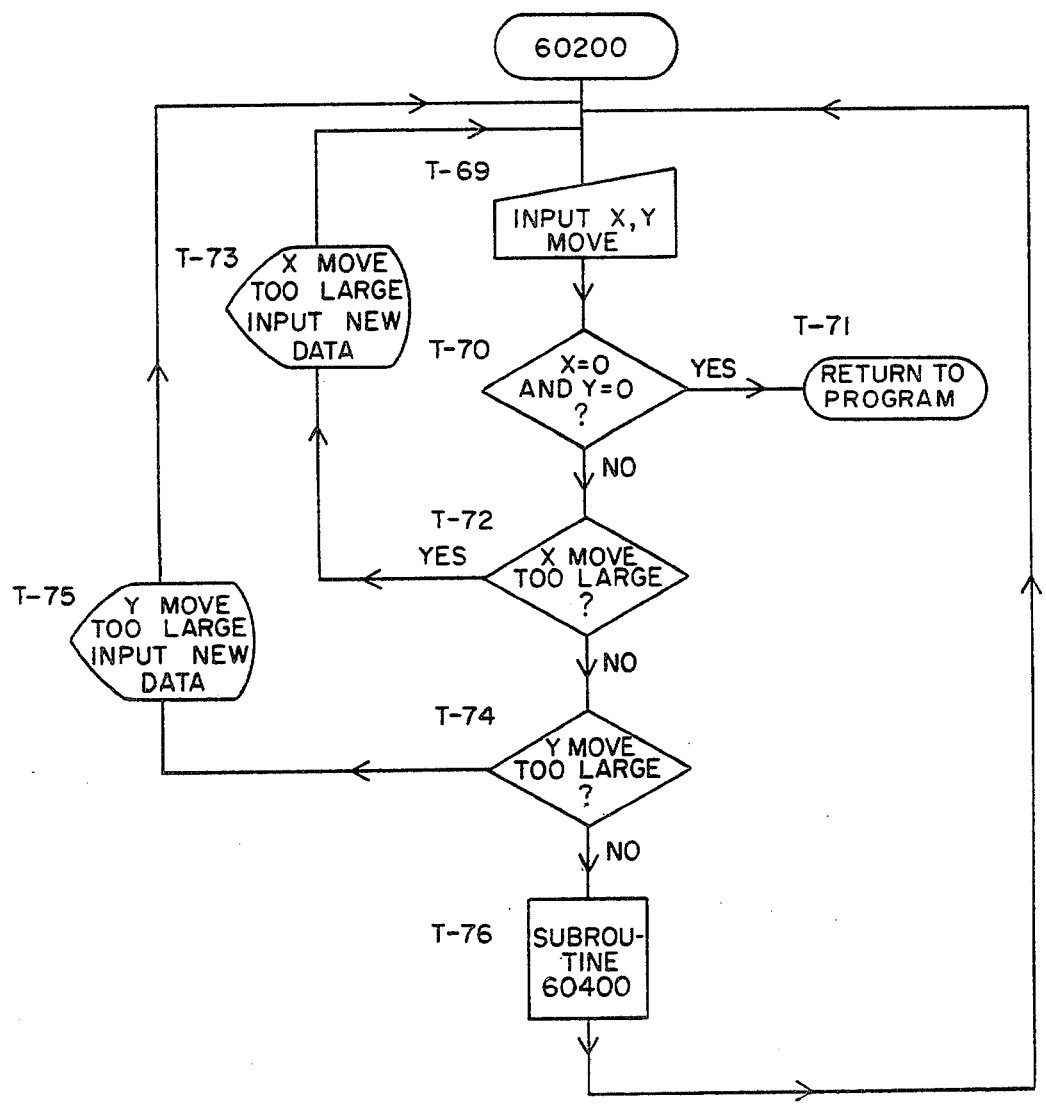

After the entire map 180 has been scanned the map 180 may also be rescanned in scenes in the manner shown in FIG. 4c.

FIG. 5 is the flow diagram for the preferred embodiment of the software utilized to perform the functions described above. The program listings are included as a microfiche appendix and are incorporated herein by reference. The software consists of a main base program and five subroutines directed to control of the table 30. The elements of these routines are designated by a "T". Four additional subroutines directed specifically to driver commands are included as FIG. 6, the elements thereof designated by a "D".

Referring now to FIG. 5, during "Initialization", T-1, the binary driver subroutines shown in FIG. 6, are loaded into the computer 90 and the driver program "Initialize", D-1 through D-3, is executed to initialize the input-output ports of the driver micro processor. The prompter monitor screen 80 is cleared and a message states that the X-Y position table 30 must be centered. When the operator responds the message asks for the value of the step increment switch, T-2. The program, T-3, calculates the number of steps possible, the increment step value in inches, as well as the size of the table available for movement. These units are printed on the screen, T-4. The operator may, at this point, T-5, restart.

The operator then is instructed to move to corner number one, T-6. Subroutine 60700, T-77 to T-80, is called T-7 which sets a designated location to one, calls the driver "Command Fetch" routine, D-4 to D-11, which converts the ASCII command character to move, to binary coded decimal (BCD) and transmits it as a command byte to the intelligent driver. Routine T-79 then calls subroutine 60420, T-86 to T-93, which stores move values to four significant digits in both the X and Y direction in the designated location. As shown in the flow diagram, T-86 to T-93, in routine 60420 four significant digits are used, each of which is processed through the "X-Y Data Fetch" driver routine, D-12 through D-18.

The "X-Y Data Fetch" routine gets the X-Y position data and converts it to binary coded decimal as output data to the intelligent driver which processes it for both drivers. As also shown in subroutine 60420 both the X position and Y position are processed by cycling through the loop twice, first for the X position and then the Y position.

After the move has been completed the operator again has the option to restart, T-9, by entering a new instruction to move to corner number one.

The coordinate position of position number one having thus been stored the operator is then instructed, T-10, to move to corner or position number two, shown in FIG. 3a. This move is initiated utilizing subroutine 60000, T-63 to T-68. The user indicates the magnitude of the Y move, T-63, which may be positive or negative or "0" indicating the move has been completed. If it is too large the operator will be informed and requested to enter a new Y value, T-67. If the operator indicates that Y equals 0, T-64, the move is complete and the subroutine returns to the base program, T-65. If the Y move is neither too large nor 0, subroutine 60400 is called, T-81 through T-85, which initially sets the designated move location, 37013, to zero, and then processes the Y move through the driver "Command Fetch" routine, D-4 through D-11, and subroutine 60420, as discussed above, which moves the table, through the drivers, and advises the operator of the new location of the table, T-84.

The operator then has the option to restart if the table is not positioned correctly, T-12. He may return to corner number one, or make additional Y movements to complete the move to position or corner number two, T-13. To continue, the coordinate position of corner number two is saved and the operator is instructed to move to corner number three, T-14. To move to corner number three subroutine 60200, T-69 through T-76, is called. In that subroutine the operator is requested to input an X and a Y move. Either may be positive or negative numbers. If both are zero then the moves have been completed, T-70, and control of the program returns to the location in the base program where the subroutine was called, T-71.

As with the 60000 routine, both the X move and the Y move are tested to see if the move is too large for the movement area available for the table, T-72 and T-74, and if either move is too large the operator is informed, T-73 and T-75. If not too large, subroutine 60400 is called which again sets the designated location to 0 and processes the move through the "Command Fetch" driver routine, D-4 to D-11, and subroutine 60420, T-86 through T-93, which processes both the X move and the Y move through the designated location, 37013, and the driver "X-Y Data Fetch" routine, D-12 through D-18.

After the move has been completed, the operator may restart, T-16, if the table has not yet been positioned correctly. If positioned correctly the position of corner number three is saved and the operator is told the table will return to corner number one, T-17, the table is moved to corner number one through subroutine 60400, T-18, and the operator is instructed to find the lower edge of the scene at corner number one and use it as the upper edge for position number four, T-19.

The table is then moved in the Y direction to position number four using subroutine 60000, T-20. The data for position number four is then stored and the total map size and the single scene size is calculated, T-22. The number of rows and columns are also calculated so that the entire map may be covered by separate scenes, T-22. Those numbers are displayed assuming overlap at the right and the lower edge of the map using the chosen scene size, T-23, and the operator is given the opportunity to raise or lower the camera and change the scene size, T-24.

If the operator elects to move the camera he is instructed to do so and then move to corner number one again, T-25. The move is accomplished with subroutine 60200, T-26, and the operator has the option to restart after the move has been completed if the table is not in correct position, T-27. The new position for corner number one is saved and the ratio of the change in the X and Y directions is calculated, T-28. This ratio is tested to determine if the move scene is valid compared to the data previously saved, T-29. If the ratio does not seem to be correct the operator is so informed, T-30, and the operator may restart by repositioning the table to a different corner number one, T-31.

If the operator chooses not to reposition the table he is informed that the new Y position will be assumed to be valid for further calculations, T-32. The new scene size is calculated and calculations are also done to insure that the whole map may be covered by the new scene size, T-33.

The program also checks to determine if the camera is too low, that is, the camera is so low that the entire map may not be covered by the scene size, T-34. If the camera is too low the operator is informed and he must raise the camera.

The program checks to determine whether there will be overlap in the last column, T-36, and the table position for the final column is calculated assuming that it would extend over the edge of the map 180, T-37. A check is made to determine whether or not the table can move to the final column position, T-38, and if the table can move that far, the operator is given the option to indicate whether he prefers the final column to overlap the previous column or extend past the edge of the map 180, T-39. The decision of the operator is entered, T-40 or T-41.

The program then checks for overlap in the last row and the operator is given an option to elect whether or not the final row will overlap the previous row or extend part the map, T-43, 44 and 45, and the decision of the operator is entered, T-46 or T-47.

The operator is then informed that the table will move through all the scenes after a command has been entered. As shown in the flow diagram, T-48, the command may be the letter "C" for "C" ontinue.

The operator inputs a "C" when ready, T-49.

The program T-50 then makes preliminary calculations to move through the whole map scene by scene. Variables are calculated to allow for the overlap of a previous scene or extension past the edge of the map 180 discussed in connection with I-39 and T-45 above. Special arrangements are also calculated and entered for the case of a single row or a single column.

The program, T-51, then calculates the position for the next scene. It starts in the upper left hand corner and then follows a path that will be back and forth across the rows down to the final row as shown in FIG. 4b. Movement is accomplished with subroutine 60400 as described above, T-52. The operator types in a "C" to obtain each scene or segment of the map or at any time can type in a "R" to stop the process and "R"estart, T-53.

The coordinate position of each segment or scene is recorded and stored in memory as well as any information concerning the analysis taking place. For example, a typical use of the apparatus might be to calculate the acreage of hydrological classifications of land. The map information would then indicate, for example, a government lot number, a comment on the hydrological analysis being performed and possibly the watershed district involved. When storing the segments in analog form using a video cassette recorder using tape having an audio track this information can be encoded on the tape using FSK, on-off keying, EBCDIC or ASCII alphanumeric character bits or in Morse Code. With video having a valid area determination, the information can be stored as alphanumeric characters outside the valid area. Thereafter when analyzing the data, this information can be set forth as well as particular segments being analyzed, all of which can be printed out as well as totals accumulated for the entire map, the mosaic image. This may be accomplished with the Apple system described as a preferred embodiment using an Epson 80FT dot matrix printer with interface or a Silent-type Printer using an Apple II Interface, Model No. A2M0036, or an Integral Data Systems Model 460G printer or equivalent.

As each scene is entered the program tests to determine if the map 180 has been completed, T-54. The operator is informed when the first pass of the map is complete, T-55.

The operator may then choose to discontinue, restart for a new map 180, or pass through the map again in the other direction, T-56. If the map 180 is to be rescanned, the table will move through the scenes by columns as shown in FIG. 4c. The program makes preliminary calculations to again move through the whole map 180 scene by scene, T-57. Variables are calculated to allow for the overlap of previous scenes or extensions past the edge of the map 180 discussed in T-39 and T-45, and special arrangements are made for the case of a single row or column.

The program calculates the position for the next scene, T-58. It starts in the upper left corner and follows a path down the first column, up the second and continuing to the final column. Again, subroutine 60400 is called and utilized, T-59, and the operator inputs a "C" when ready to continue to the next scene or a "R" to stop the process and restart, T-60.

The operator is then able to return to the alignment part of the program to align a new map 180 or return to the set-up position to change the area covered or to change the camera height, T-62. He may also choose to terminate processing.

At this point the system has met the primary objectives of the invention. The data is acquired for large format video display. It is stored in analog form in a series of mosaic segments, each having the required degree of resolution or clarity. It can then be conveniently reassembled and analyzed segment by segment to provide accuracy of better than one percent in a thirty by forty inch map 180 as posited.

Processing is preferably accomplished by segment from the display. For the example set forth above, the hydrological survey of watershed districts or areas, or for a myriad of other applications, such as calculation of change over time using maps, photographs or x-rays or measurements of areas, distances, relative electromagnetic reflectance or transmittance or other parameters which can be the subject of video analysis, each may be processed using available video analysis equipment. One such piece of equipment found to be compatible with the data acquisition system of this invention as described above, is the Write and Edit Circuitry for Electronic Marking of Displayed TV Signal Images with the LMS measurement system disclosed and claimed in U.S. Pat. No 4,315,282, issued Feb. 9, 1982, manufactured by Measuronics Corporation, the Assignee of the instant invention (LMS is a trademark of Measuronics Corporation), the disclosure of which is incorporated herein by reference.

The invention of the aforementioned patent includes, as a preferred embodiment, video input means including a video camera 24 and video cassette recorder 14, electronic marking means including a Light Pencil marking implement 18, a light pen 16, cursor controls 53, and gray level detection circuitry 50. (LIGHT PENCIL is a trademark of Measuronics Corporation.) Video overlay means for generating a digital bit plane overlay signal 36 is provided including memory 40 for selectively storing the data bits for the digital bit plane 36. The invention also includes a number of controls 103 to enter and erase data bits, display means to accumulate and analyze data and data processing means for purposes of measurement and calculation.

When combined with the elements of the invention described above the digital bit plane overlay 36, the data processing means and associated memory 40 can conveniently be provided by the keyboard controlled microcomputer 90. Thus, the combination readily achieves a myriad of analysis possibilities including dual or alternate image presentation, of a photograph and a map of the same area for example, with scale adjustable on either by adjusting camera 10 height or zoom 20. Similarly, overlaying of images is possible. Also, gray levels can be detected to select desired features or, by entering selected features in memory, color capability is also possible for enhancement and feature selection. Specific areas, lines or data points can be selected for analysis with the cursor controls 53, light pen 16 or the Light Pencil marking means 18.

The desired data calculations can then conveniently be performed by the microcomputer 90 and data output can be in any conventional form, analog, digital, alphanumeric on a display screen or printer, or in any of the above forms on a plotter.

As indicated above, data accumulated by the instrumentation can be printed with compatible printing devices or can be displayed in the manner disclosed in the aforementioned patent. Using the data acquisition system components overlapped data or data beyond the edge of the map can be block edited. The percentage overlap or extension can be calculated from the X/Y ratios developed earlier and the X-Y coordinate locations identified of the overlap area. Then the next to last scene can be accepted in its entirety but only the calculated number of lines of the last scenes. Alternatively, only the first twenty-five lines of an overlapped scene might be accepted, disregarding the balance, and all of the last scene analyzed. Since calculations are performed using a digital base, column overlap is similarly handled using pixels of information per line. Using video analysis equipment as described in the patent discussed above, overlapped scenes may also be differenced to preserve only the unoverlapped data and/or extraneous data from overlapped scenes or scenes which extend past the edge of the map 180 can be edited as described in the patent.

As described above, the preferred embodiment of the invention utilizes a moveable table 30 upon which the subject to be analyzed 180 is placed with two pieces of plexiglass 34, 36, with light diffusion characteristics, one on each level of the table 30, interposed between the objective 180 and the light source 50 if back lighting is to be used. Since milk plexiglass or equivalent light distributing glass has very even light distribution characteristics and since the light sources are stationary, whether back lighted 150 behind the plexiglass 34, 36, or top lighted 162, 164, and since the camera 10 remains stationary relative to the light source 150 or 162, 164, the illumination of the object 180 on the top plane of the X-Y table 30, the objective surface 140, remains very stable. The only variables in this configuration, if back lighting 150 is used, are the variations in light transmittance density (such as material flaws) in the plexiglass 34, 36, and the light transmittance density of object 180 being scanned as they pass between the two stationary elements (the light source 150 and the camera 10).

It is also much easier and probably also only practical to illuminate a small area with uniform density of lighting because of the light source characteristics available in current technology (neon, fluorescent, incandescent). In this instance, the lighted area is relative to the camera 10 field of view, which is relatively small compared to the size of the surface being scanned such as the map 180. And the field of view is in a constant position relative to the light source, 150.

This eliminates the need to compensate analysis of the images scanned with the system for light intensity "variables" introduced by the light source 150 or 162, 164 as these become no longer "variable". If light density anomalies exist in the system, they are not variable but are constant. This is because the camera 10 to light source 150 path is stationary and only the stable diffusion element (the plexiglass 34, 36) and the object of interest 180 move between the source 150 and the camera 10. This eliminates the need to compensate anomalies based on locations over a very large surface stemming from a very large light source, the large surface itself, and the varied position of a moveable camera 10, viewing through a zoom lens 20, these distributed anomalies at different scales.

In other words, if the camera 10 were moved rather than the table 30, and the light source 150 and the object 180 remain stationary, then density variables will inherently exist and those variables will be more complex and require compensation during analysis. In addition, with the light source 150 stationary, a very large light source is required which causes more heat and creates more ambient light in the room in which the system exists which further interferes with analysis of images introduced through the system. Therefore, the preferred embodiment of the invention utilizes stationary light sources 150, 162, 164 and a stationary camera 10 and a moveable X-Y positioning table 30 upon which the image to be analyzed is placed.

Nevertheless, in those situations where work space is limited it is recognized that leaving the surface to be analyzed stationary and moving the video equipment 7, 10 and 20, and associated light sources 150, 162, 164, even though more complex, may be desirable in view of the limited work space. Such a system is within the intendment and scope of the appended claims and can be achieved from the teaching of the preferred embodiment. In such a system it is preferred that two X-Y positioning means 30, 30' and 40, 40' be utilized (or direct mechanical table drive such as a bracket (not shown) attached as an extension of the first system); a first system associated with the camera 10 and top lighting 162, 164, sources and a second X-Y positioning table (or drive system attached to the first table) associated with the bottom lighting source 150. The driver commands D1–D18 should then be synchronized and fed to both systems to alleviate, to the extent possible, the lighting anomalies discussed above. In such a modified system very stable and vibration free camera support means 60 are required since camera 10, filter and lens 20 and lighting sources 150, 162, 164, constituting a mass of over ten pounds, must be moved rather than the mass moved in the preferred embodiment, the map 180, and diffusion plate, a mass of less than a pound. This allows for more efficient overall operation and releases restraints on mechanical designs opening the way for higher speed, lighter construction, and greater accuracy.

The foregoing Specification sets forth certain preferred embodiments and modifications of the invention and some of the ways in which the invention may be put into practice including the best mode presently contemplated by the inventor for carrying out this invention. Modifications of the described embodiment, other than those described, as well as alternate embodiments and devices for carrying out the invention will also be apparent to those skilled in the art. For example, the functions of the microprocessor associated with the intelligent driver in the X-Y table controller can conveniently be incorporated as a function of the microcomputer 90 if sufficient memory locations are available. Other such modifications and variations will occur to those skilled in the art. All such modifications are intended to be within the spirit and scope of the following claims.

I claim:

1. A data acquisition system for a large format analog video display comprising:
   an objective surface upon which the subject to be displayed is placed;
   means for acquiring a mosaic image of the entire subject in a plurality of analog video images of the subject, each analog video image being a segmented portion of the mosaic image of the subject, the video acquisition means being positioned relative to the subject so that the subject can be sequentially scanned in the segmented portions in a predetermined order by the video means; and
   wherein each video image comprises a plurality of scan lines, each scan line consisting of continuous analog data;
   means for causing relative movement between the video acquisition means and the subject so that the subject can be scanned in the segmented portions each segmented portion comprising one of the video images, said means for causing relative movement comprising;
   processing means for receiving input commands and for supplying control signals to cause relative and sequential movement in a predetermined order between the objective surface and the means for acquiring analog video images;
   lighting means for illuminating the objective surface for purposes of the video acquisition of data; and
   data storage means connected to the means for acquiring the plurality of video images for storing the video images as the segmented portions of a mosaic display of the entire subject for subsequent mosaic processing.

2. The data acquisition system of claim 1 wherein the processing means comprises a programmable, digital processing means for storing input data and control information, the control information including a stored program for directing control functions to be performed and for supplying control signals to the means for causing relative movement as a function of the control information.

3. The data acquisition system of claim 2 wherein the processing means comprises a keyboard controlled microcomputer wherein input data and input commands can be entered into the microcomputer by means of the input keyboard.

4. The data acquisition system of claim 1 wherein the means for acquiring a plurality of video images of the subject comprises a video camera and wherein the data acquisition system further comprises camera support means for supporting the video camera above the objective surface.

5. The data acquisition system of claim 4 wherein the video camera support means comprises tip and tilt adjustment controls so that the target of the vidicon tube in the video camera can be aligned in a parallel relationship with the objective surface.

6. The data acquisition system of claim 4 wherein the video camera is rotatably supported by the camera support means so that the target of the vidicon tube in the video camera can be longitudinally and laterally aligned with the edges of the objective surface being scanned.

7. The data acquisition system of claim 4 wherein the camera support means comprises height adjustment means so that the height of the camera above the objective surface can be adjusted.

8. The data acquisition system of claim 4 wherein the system further comprises a plurality of lens associated with the video camera so that the focal length between the video camera and the objective surface can be adjusted by means of adjusting the lens.

9. The data acquisition system of claim 8 wherein at least one of the lens attachments is a zoom lens for adjusting the focal length between the video camera and the objective surface.

10. The data acquisition system of claim 2 wherein the means for causing relative movement between the video acquisition means and the objective surface comprises at least one X-Y positioning table electronically connected to the processing means so that control signals from the processing means precisely control the position of the X-Y positioning table.

11. The data acquisition system of claim 10 wherein the subject to be displayed is placed on the surface of the X-Y positioning table and wherein the processing means causes the subject to be sequentially moved in segmented positions beneath the means for acquiring a plurality of video images.

12. The data acquisition system of claim 10 wherein the data acquisition system further comprises an X-Y positioning table controller interposed between the X-Y positioning table and the processing means and wherein the X-Y table controller comprises second processing means for receiving control signals from the first processing means and for causing the X-Y positioning table to move according to the stored program.

13. The data acquisition system of claim 1 wherein the data storage means comprises a video buffer for sequentially storing the video images as segmented portions of a mosaic display of the entire subject.

14. The data acquisition system of claim 13 further comprising a video buffer controller for causing the video buffer to record and store the sequential video image segments and to ignore intermediate images when the means for causing relative movement between the video acquisition means and the subject is moving between the sequential video images.

15. The data acquisition system of claim 13 wherein the system further comprises display means for displaying the plurality of video images.

16. The data acquisition system of claim 15 wherein the display means comprises an output monitor for displaying the video images as they are being acquired by the means for acquiring a plurality of video images and for displaying the stored video images stored in the video buffer.

17. The data acquisition system of claim 15 wherein the display means comprises a prompter monitor associated with the processing means for monitoring commands issued by the operator of the system and for requesting further information from the operator according to the stored program for directing control functions to be performed. and wherein the stored image segments can be selectively displayed on the prompter monitor for purposes of analysis and calculation.

18. The data acquisition system of claim 15 wherein the data acquisition system further comprises means for analyzing the data acquired by the means for acquiring the plurality of video images and wherein the processing means includes means for analyzing the data and means for calculating output data based on the analysis of the images displayed by the display means.

19. A data acquisition and analysis system for large format video displays comprising, in combination:
   means for automatically and sequentially acquiring in a predetermined order a plurality of segmented video images of an objective surface, the objective surface having a subject thereon for mosaic processing, each segmented image being an image of a portion of the subject; each segmented video image comprising a plurality of scan lines, each scan line consisting of continuous analog data;
   means for sequentially storing the plurality of image segments for subsequent mosaic processing;
   means for recalling the segmented images for purposes of analysis;
   means for analyzing each segment as a component part of the mosaic image.

20. The data acquisition and analysis system of claim 19 wherein the means for sequentially acquiring a plurality of segmented video images comprises:
   means for sequentially acquiring the images in rows and columns of images wherein the last row and column is either overlapped or extends past the edge of the objective surface and wherein the means for analyzing each segment as a part of the mosaic image comprises:
      means to block edit overlapped scenes or scenes which extend past the edge of the objective surface.

21. The data acquisition and analysis system of claim 19 wherein the means for analyzing each segment as a component part of the mosaic image comprises means to electronically mark selected features of each image for purposes of analysis.

22. The data acquisition and analysis system of claim 21 wherein the combination further comprises:
   memory means; and
   means to store in the memory means each selected feature marked for purposes of analysis.

23. The data acquisition and analysis system of claim 19 wherein the combination further comprises a second video acquisition means and wherein the means for analyzing each segment comprises means for displaying both the video image acquired by the second video acquisition means and one of the stored video images simultaneously or alternatively.

24. The data acquisition and analysis system of claim 19 wherein the means for analyzing each segment as a component part of the mosaic image comprises:
   display means for displaying each segmented video image;
   and wherein the combination further comprises:
      means for generating a digital bit plane overlay connected to the display means; and
      means for entering and editing data into and from the digital bit plane overlay.

25. A method of acquiring data for large format video display comprising:
   placing a subject to be analyzed on an objective surface;
   positioning a video camera and the subject relative to each other so that the subject can be scanned in a plurality of video images;
   calibrating the system by causing relative movement between the video camera and the subject so that a first calibration position location is acquired which defines two edges of the subject to be acquired and, subsequently a second calibration position location is acquired which defines the other two edges of the subject to be scanned; and
   sequentially scanning the subject in rows and columns beginning with the first calibration position and ending with the second calibration position.

26. The method of claim 25 wherein a third calibration position is obtained which aligns one edge of the first calibration position with one edge of the second calibration position.

27. The method of claim 26 wherein a fourth calibration position is obtained which aligns one edge of the first calibration position with one edge of the fourth calibration position.

28. The method of claim 25 wherein all calibration positions can be changed by locating a new first calibration position.

29. The method of claim 25 wherein image segments are acquired sequentially in rows of information beginning with the first calibration position and ending with the second calibration position.

30. The method of claim 25 wherein image segments are acquired sequentially in columns of information beginning with the first calibration position and ending at the second calibration position.

31. The method of claim 30 wherein the last column of image segments extends over the edge of the objective surface.

32. The method of claim 31 wherein the method further comprises calculating data based on the information in the image segments and wherein each portion of the last column of image segments which extends over the edge of the objective surface is block edited during calculation of data based on the image segments.

33. The method of claim 30 wherein the last column of image segments overlaps the previous column of image segments.

34. The method of claim 33 wherein the method further comprises calculating data based on the information in the image segments and wherein the overlapped portion of the columns is block edited from one of the columns during calculations based on the image segments.

35. The method of claim 29 wherein the last row of image segments extends over the edge of the objective surface.

36. The method of claim 35 wherein the method further comprises calculating data based on the information in the image segments and wherein each portion of the last row of image segments which extends over the edge of the objective surface is block edited during calculation of data based on the image segments.

37. The method of claim 29 wherein the last row of image segments overlaps the previous row of image segments.

38. The method of claim 37 wherein the method further comprises calculating data based on the information in the image segments and wherein the overlapped portion of the rows is block edited from one of the rows during calculations based on the image segments.

* * * * *